J. H. ROGERS AND H. H. LYON.
WIRELESS SIGNALING SYSTEM.
APPLICATION FILED NOV. 10, 1916.
1,322,622.
Patented Nov. 25, 1919.
3 SHEETS—SHEET 1.
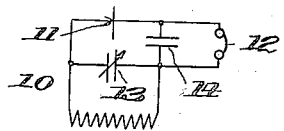
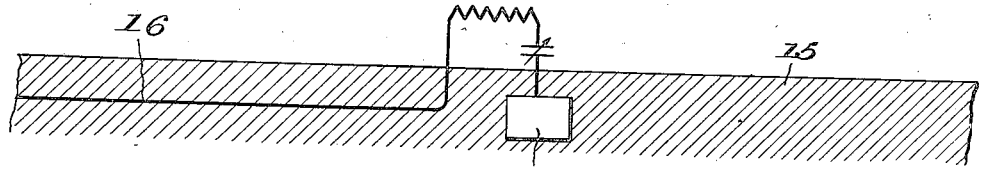
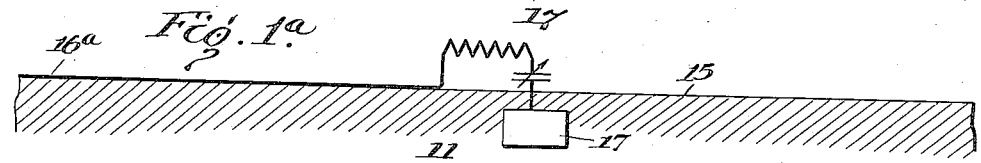
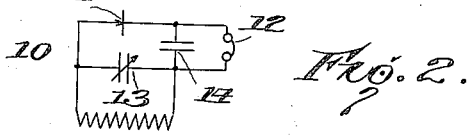
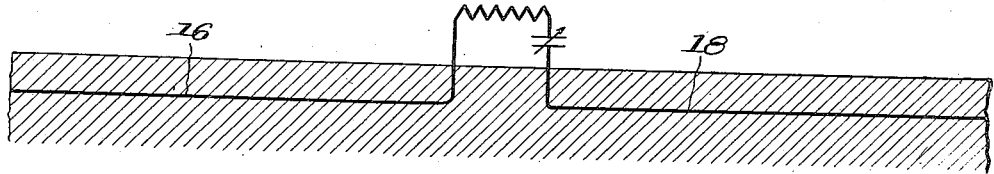
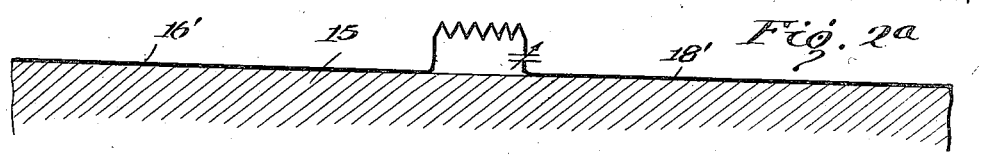
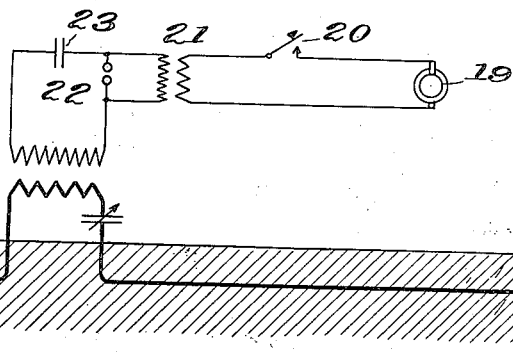
Inventor
James Harris Rogers
Henry H. Lyon
By
Attorney

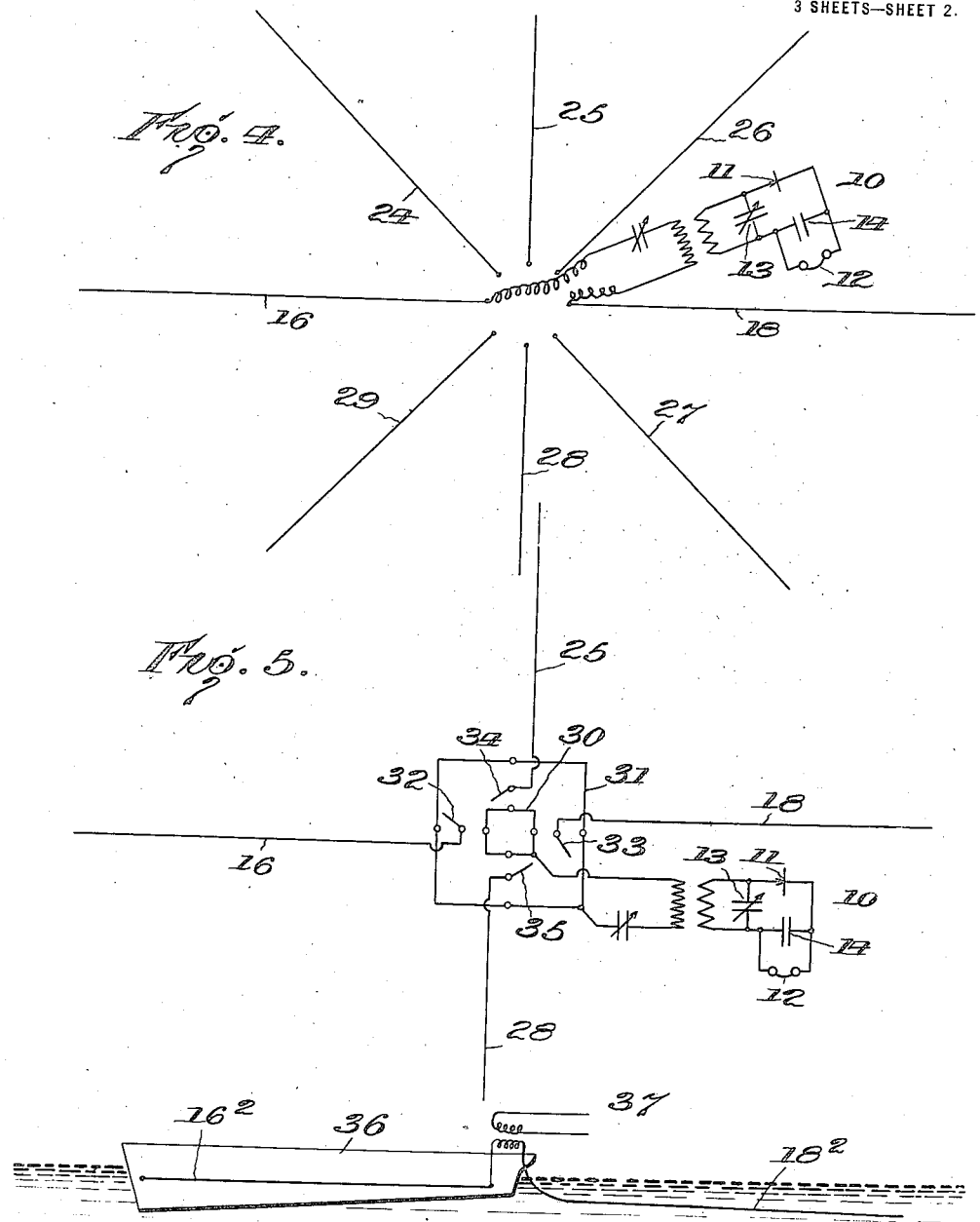

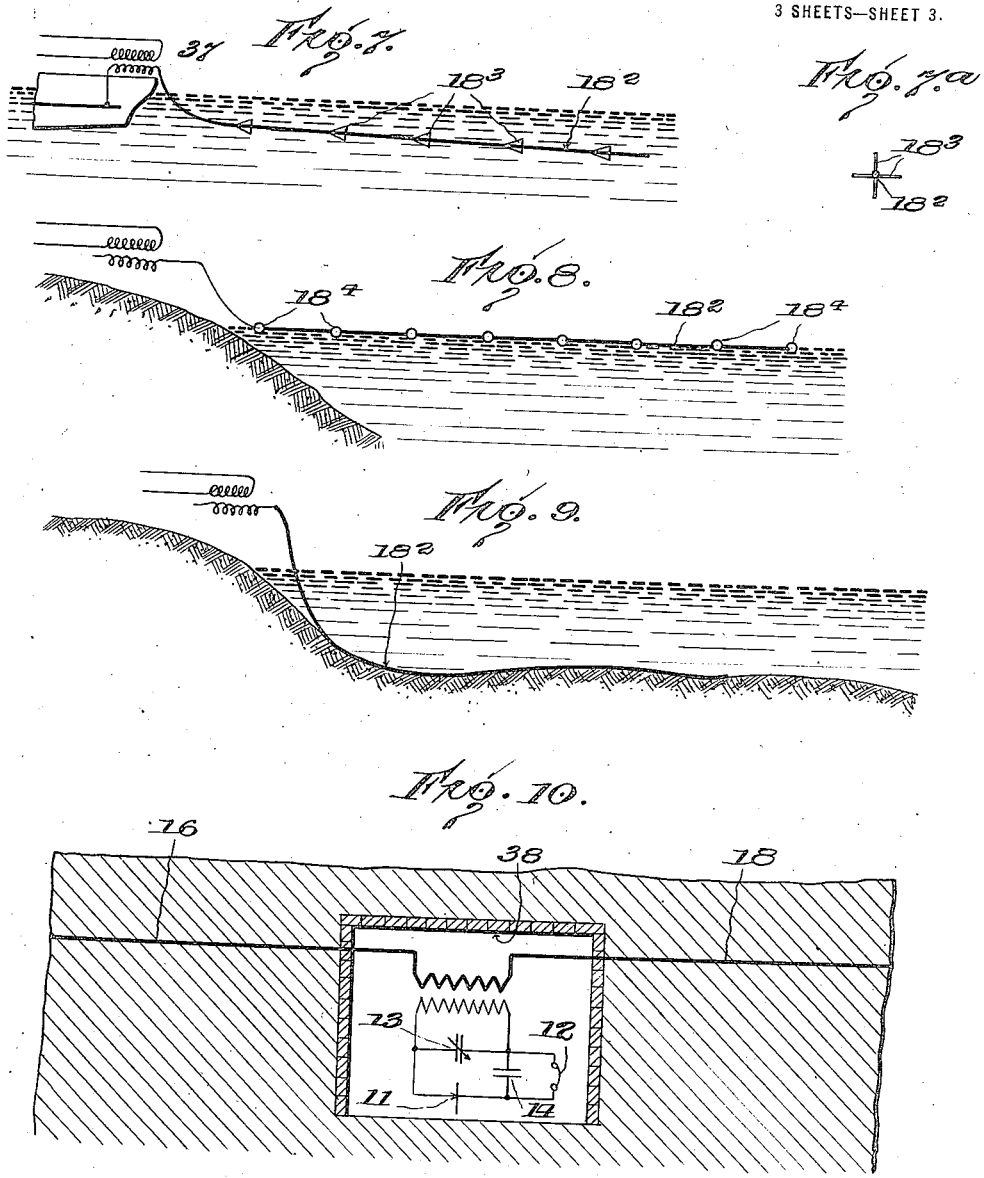

UNITED STATES PATENT OFFICE.

JAMES H. ROGERS AND HENRY H. LYON, OF HYATTSVILLE, MARYLAND.

WIRELESS SIGNALING SYSTEM.

1,322,622. Specification of Letters Patent. Patented Nov. 25, 1919.

Application filed November 10, 1916. Serial No. 130,603.

*To all whom it may concern:*

Be it known that we, JAMES H. ROGERS and HENRY H. LYON, citizens of the United States, residing at Hyattsville, in the county of Prince Georges and State of Maryland, have invented new and useful Improvements in Wireless Signaling Systems, of which the following is a specification.

Our invention relates to the transmission of electrical impulses or oscillations to a distance, primarily for the purpose of conveying intelligence, and it pertains to means for both sending and receiving.

In systems of wireless sending and receiving now in general use one or more conductors or capacities are employed disposed above the surface of the earth, which conductors or capacities serve to radiate or receive the impulses in the sending or receiving of messages. Such elevated conductors are costly to erect and maintain, as to obtain efficiency and long-distance transmission it is necessary to have them at considerable distance above the surface of the earth. This necessitates expensive towers and masts, and moreover both the conductors and the towers or masts are exposed to weather conditions—wind storms, lightning, snow and ice—which often impede or entirely prevent the operative use of the system. We are aware that it has been proposed also to employ a conductor elevated above the earth in connection with a buried conductor.

Our invention has for its principal object the provision of a system not subject to the above objections; a system in which the communication, both sending and receiving, is clear and effective; in which the communication is selective and the direction of transmission may be readily determined; in which multiple transmission may be effected; and in which the sending and receiving of messages to and from stations on land and on water may proceed independent of weather conditions.

We have discovered that signals can be sent and received with great facility by the employment of wires laid directly on, or buried in, the earth and in intimate contact therewith substantially throughout their length and parallel to the surface.

The invention also consists in the novel features and combinations of circuits and apparatus in the wireless signaling system hereinafter described and claimed, and illustrated in diagram in the accompanying drawings, in which—

Figure 1 is a system in which a single antenna is shown buried beneath the surface of the earth, the signal instruments being those of a receiving station;

Fig. 1ª shows the system with the antenna lying along the surface of the earth in intimate contact therewith substantially throughout its length, the signal instruments being omitted;

Fig. 2 is a view similar to Fig. 1 showing two antennæ extending in opposite directions;

Fig. 2ª is a view similar to Fig. 2, the antennæ being shown lying along the surface of the earth in intimate contact therewith substantially throughout their length instead of being buried beneath the surface, and the signal instruments being omitted;

Fig. 3 is a view similar to Fig. 2, but with the instruments of a sending station;

Fig. 4 is a diagram showing in plan a plurality of antennæ extending outwardly in different directions;

Fig. 5 is a similar view, including also switching means for making the proper connections;

Fig. 6 shows the invention applied to the earth's surface upon the water;

Fig. 7 is a view similar to Fig. 6, showing an additional feature of the antenna;

Fig. 7ª is a detail of the form shown in Fig. 7;

Fig. 8 shows the antenna supported on the surface of the water;

Fig. 9 shows the antenna on the surface of the earth below the surface of the water; and Fig. 10 is a view similar to Fig. 2, showing the entire installation underground.

Referring to the drawings, signal instruments are indicated at 10, and in Figs. 1 and 2 are those of a receiving station, while in Fig. 3 the instruments of a sending station are shown. In Figs. 1 and 2, 11 is a detector of any type, preferably an audion, 12 a telephone, and 13 and 14 are the usual condensers. Any desired type of instruments and arrangement of connecting circuits may be employed.

The surface of the earth is indicated at 15, and the antenna at 16. This latter extends in a direction substantially horizontal, either upon or below the surface of the earth, and is preferably in contact with the earth substantially throughout its length. The antenna thus constitutes a ground connection along its entire length, and, it is believed, a considerable portion of the earth's surface about the antenna thus coöperates with the latter in sending or receiving oscillations.

Instead of being below the surface, as shown in Fig. 1 at 16, the antenna may lie upon the surface of the earth, as shown at 16', in Fig. 1ª, being in intimate contact with the earth substantially throughout its entire length.

In coöperation with the antenna we may, and preferably do, employ another earth connection, this being shown in Fig. 1 as a ground plate 17.

Fig. 2 is an embodiment of the invention in which two antennæ are employed extending in opposite directions, the second antenna 18 being connected in place of the ground plate shown in Fig. 1. This arrangement is more effective than with the use of the ground plate.

Fig. 2ª shows the antennæ 16' and 18' extending in opposite directions upon the surface of the earth and in intimate contact therewith substantially throughout their length, the signal instruments connected between the antennæ being indicated by one member of the indirect coupling.

Fig. 3 shows the same arrangement as Fig. 2 but with sending instruments instead of receiving instruments. These comprise a generator 19, key 20, transformer 21, spark gap 22 and condenser 23. Any other sending arrangement and instruments may be employed instead of those shown.

In order to obtain the maximum efficiency it is desirable to have the antennæ disposed in a line at right angles to the wave fronts. and in order that this may be accomplished for the different directions we provide antennæ extending in different directions but substantially horizontal or parallel to the surface of the earth and either on or under the surface and in contact with the earth throughout their lengths. Such an arrangement is illustrated in Fig. 4 where eight antennæ are shown. These are designated 16, 24, 25, 26, 18, 27, 28 and 29. The instruments are shown connected to antennæ 16 and 18, but may be connected to any other two or more. Sometimes it is necessary to connect to several antennæ in order to obtain the best results. The signal instruments may be connected by any suitable switching devices to any two or more of antennæ and the direction of transmission thus ascertained. Usually the connection would be made with the pairs of oppositely extending antennæ, but the instruments may be connected to any two or more desired. Also, for multiplex transmission separate instruments may be connected to different pairs or groups.

Any preferred switching devices may be employed to connect the instruments to the antennæ, a convenient arrangement being shown in Fig. 5. The instruments are connected to bus wires 30 and 31, and each antenna 16, 18, 25, 28 is connected to a switch blade 32, 33, 34 and 35 respectively. Any additional number of antennæ desired may be employed in the same way. Each switch blade coöperates with a contact upon each bus wire. The instruments may thus be connected with any one or two or more antennæ.

The invention is also applicable to the surface of the earth where there is water. For instance, on the sea coast the antennæ may be run out from shore into the water or along the shore on the surface of or under the sand. In this way the system is useful for life-saving stations, light-houses, &c.

The system is also adapted to the use of vessels at sea, including submarines. We have demonstrated that the receiving is highly efficient when the antennæ are lying on the bottom, as shown in Fig. 9, either in fresh or salt water. The antennæ may also be supported by floats along the surface of the water, as shown at 18⁴ in Fig. 8, or suspended in the water above the bottom.

A specific embodiment of this last mentioned feature of the invention is shown in Fig. 6 where 36 indicates a boat or vessel, 16² one antenna and 18² another antenna. The antenna 16² may be mounted along the side of the vessel but preferably insulated therefrom or attached only at the bow and stern, or with vessels of wood or other insulating material it may even be mounted inside. When the vessel is iron or other metal, the vessel itself may be employed as this antenna, provided the capacity is not too great.

By this arrangement it will be seen that very long antennæ may be used. The length of the antenna mounted upon the body of the vessel is only limited by the length of the vessel, and as many vessels are over three hundred feet long, and some are 600 to 800 feet, the necessary length of antenna for long distance work is readily accommodated. The other antenna, trailing from the stern of the vessel, may be at least as long as, or even longer than, the antenna mounted upon the body of the vessel. If desirable, these and the other antennæ described may be replaced by multiple strands.

The antenna 18² may be a wire allowed to trail astern, and will approximate the horizontal, according to the speed. Fins 18³ may be added at intervals along the wire, as shown in Figs. 7 and 7ª, to increase this action. The signal instruments are associated with these antennæ in any desired manner, as at 37.

When applied to submarines, it will be seen, therefore, that messages may be sent and received while running partially or entirely submerged.

In accordance with the patent statutes we have described what we now believe to be the best embodiment of the invention, but we do not wish to be understood thereby as limiting ourselves or the scope of the invention, as many changes and modifications may be made without departing from the spirit of the invention and all such we aim to include in the scope of the appended claims.

For instance throughout the several figures, the signal instruments are shown associated with the antenna or antennæ by indirect coupling, but may be associated therewith in any other manner desired. It will be seen also that while the signal instruments are shown diagrammatically above the earth, they will in practice often be actually located in a pit below the ground level or entirely underground between the antennæ. This construction is shown in Fig. 10, the pit being indicated at 38. When the antennæ are entirely underground, the effects of lightning on the receiving of signals are nearly eliminated, so that only slight clicks are heard instead of loud prolonged hissing.

It will be understood that the system works with either sustained oscillations or damped wave trains.

What we claim and desire to secure by Letters Patent of the United States, is—

1. A wireless system for signaling by electromagnetic waves comprising an antenna extending in direction substantially parallel to and under the surface of the earth and in intimate contact therewith substantially throughout its length, an additional earth connection, and electromagnetic wave signal instruments connected to said antenna and said additional earth connection.

2. A wireless system for signaling by electromagnetic waves comprising signal instruments, a plurality of antennæ associated therewith extending outwardly therefrom in direction parallel to the surface of the earth and each in contact with the earth substantially throughout its length, and means for connecting said instruments between two or more of said antennæ.

3. A wireless system for signaling by electromagnetic waves comprising signal instruments, a plurality of antennæ associated therewith extending outwardly therefrom in direction parallel to and below the surface of the earth in contact therewith substantially throughout their length, and means for connecting said instruments between two or more of said antennæ.

4. A wireless system for signaling by electromagnetic waves comprising signal instruments, an antenna extending outwardly therefrom, and a second antenna extending in the opposite direction, said antennæ being parallel to the surface of the earth in contact therewith substantially throughout their length, and means for connecting said instruments between said antennæ.

5. A wireless signaling system comprising signal instruments, a plurality of antennæ associated therewith each extending outwardly in direction parallel to the surface of the earth in intimate contact therewith substantially throughout its length, and switching means to selectively connect said signal instruments to any two or more of said antennæ.

6. A wireless signaling system comprising signal instruments, a plurality of antennæ in pairs associated therewith, the members of each pair extending outwardly in direction parallel to and below and in intimate contact with the surface of the earth, and switching means to selectively connect said signal instruments to said antennæ pairs.

7. In combination with a boat or vessel, an antenna thereon below the surface of the water extending in direction substantially parallel to the surface of the water, and electromagnetic wave signal instruments associated with said antenna.

8. In combination with a boat or vessel, an antenna thereon extending in direction parallel to and under the surface of the water in contact therewith, and signal instruments for electromagnetic waves associated with said antenna.

9. In combination with a boat or vessel, a signaling system comprising electromagnetic wave signal instruments, an antenna on said boat, and a second antenna extending in the opposite direction, said antennæ being parallel to and under the surface of the water and in contact therewith substantially throughout their length, and each connected with said instruments.

10. In combination with a boat or vessel, a signaling system comprising electromagnetic wave signal instruments, an antenna on said boat or vessel below the surface of the water, and a second antenna extending rearwardly from the vessel below the surface of the water, said instruments being connected between said antennæ.

In testimony whereof we have hereunto set our hands in presence of two subscribing witnesses.

JAMES HARRIS ROGERS.
HENRY H. LYON.

Witnesses:
JOHN GIBSON,
S. WILLIAM FORD.